United States Patent
Reeds, III et al.

(10) Patent No.: US 8,270,608 B2
(45) Date of Patent: *Sep. 18, 2012

(54) APPARATUS, SYSTEM AND METHOD FOR DETECTING A LOSS OF KEY STREAM SYNCHRONIZATION IN A COMMUNICATION SYSTEM

(75) Inventors: James Alexander Reeds, III, New Providence, NJ (US); Wen-Ping Ying, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/625,774

(22) Filed: Nov. 25, 2009

(65) Prior Publication Data

US 2010/0070762 A1    Mar. 18, 2010

Related U.S. Application Data

(63) Continuation of application No. 09/783,843, filed on Feb. 15, 2001, now Pat. No. 7,627,121.

(51) Int. Cl.
    *H04L 9/12* (2006.01)
(52) U.S. Cl. .............................. 380/260; 380/274

(58) Field of Classification Search ................. None
     See application file for complete search history.

(56) References Cited

U.S. PATENT DOCUMENTS 5,841,873 A * 11/1998 Lockhart et al. ............. 713/181
6,980,658 B1 * 12/2005 Rezaiifar et al. ............. 380/274

OTHER PUBLICATIONS

Stallings, Data & Computer Communications, 2000, Prentice Hall, 6th Edition, pp. 627-635.*

* cited by examiner

*Primary Examiner* — Minh Dinh
(74) *Attorney, Agent, or Firm* — Moazzam & Associates, LP

(57) ABSTRACT

An apparatus, system and method provides an out-of-synchronization detection by using a network layer checksum. A process operating at an upper layer verifies that a checksum embedded in a network layer header is correct before encrypting and transmitting a data packet containing the header and a payload. The data packet is received through a wireless communication channel at a receiver and decrypted. A calculated checksum is calculated on the received payload at the receiver and compared to the received checksum embedded in the header. A key stream used at the receiver for decrypting the received encrypted data packets is determined to be out of synchronization with a key stream used at the transmitter to encrypt the data packets if the calculated checksum is not equal to the network layer checksum.

17 Claims, 6 Drawing Sheets

APPARATUS, SYSTEM AND METHOD FOR DETECTING A LOSS OF KEY STREAM SYNCHRONIZATION IN A COMMUNICATION SYSTEM

This application is a continuation of U.S. patent application Ser. No. 09/783,843, filed Feb. 15, 2001, now U.S. Pat. No. 7,627,121, the content of which is incorporated by reference herein in its entirety.

BACKGROUND OF THE INVENTION

The invention relates in general to communication systems and more specifically to methods and systems for validating the integrity of transmitted data.

Conventional communication systems utilize encryption or encipherment techniques for several purposes including authentication, key distribution, confidential data transmissions and non-repudiation. Data is often encrypted using a key, transmitted through a communication channel, and decrypted (deciphered) at a receiver using another key. A common method of encrypting for confidentiality includes modulo two adding, or otherwise mixing, a pseudo random "key stream" with the data stream. At the receiving end, a copy of the key stream is used to decode or decrypt the transmitted message to obtain the original data. The key stream used at the receiving end, however, must be applied to the incoming transmitted data stream in an appropriate timing and order. If the decrypting key stream is not synchronized to the encrypting key stream, the data cannot be decrypted properly. In order to maintain accurate reception of data, techniques are used to detect an out-of-synchronization situation where the system determines that the decrypting key stream is not properly being applied to the incoming data.

Although encryption methods may provide for secrecy for the transmitted data by requiring a key to decode the message, encryption does not necessarily prevent tampering of the data by third parties. Further, encryption does not always provide an indication that the data has not been received as transmitted. For many encryption schemes, the integrity of the transmitted data must be validated using an additional mechanism or process. Message digests are used to secure the integrity of data but do not typically provide secrecy. Message digest methods allow a communication system to determine whether a data in a transmitted message has been manipulated or corrupted, either intentionally by an unscrupulous party or due to system errors. In one such method, a hash function or checksum function calculation is applied to the contents of the message or to an agreed-upon portion of the message. The results of the calculation are appended to the message as a message digest, allowing verification at the other end that an independent copy of the message digest calculated from the received message contents agrees with the received message digest. This procedure can be applied either to the message as a whole, or separately to each packet in the message, or both. In any case, a message digest mismatch may mean either the message or digest were accidentally corrupted in transmission or a deliberate attempt was made to alter or tamper with the message contents. In addition to corruption and tampering, a mismatch may indicate that the message digest has been applied incorrectly. For example, if the data is also being encrypted for confidentiality, a mismatch will occur if the key streams have been incorrectly synchronized.

Conventional systems do not utilize transmission bandwidth efficiently to provide out-of-synchronization and data integrity detection. In many communication systems, transmission bandwidth is inefficiently used by transmitting synchronization information through the communication channel. In these systems, the level of integrity of the data increases with the use of bandwidth. In other words, larger or longer message digests result in more robust systems at the cost of valuable bandwidth.

SUMMARY OF THE INVENTION

What is needed in the art is a system and method of minimizing the use of bandwidth to provide a mechanism to detect a loss of synchronization between an encryption key stream and a decryption key stream. The present invention provides a system and method of using a minimal amount of bandwidth to detect a loss of synchronization.

In an exemplary embodiment of the invention, a checksum embedded in a header of a received message is compared to a calculated checksum based on at least a portion of a payload of the message. The payload of the message appears as a payload from the perspective of the lower layer but may include an address, a header, or other information in addition to user data. The decryption key stream used for decryption is determined to be out of synchronization with the encryption key stream used for encryption if the two checksums are not equal. In the exemplary embodiment, a checksum within the header of the message is verified at the transmitter before the message is encrypted using the encryption key stream and transmitted through a wireless channel at a physical layer. At the receiver, the received message is decrypted using the decryption key stream at a security sub-network layer. At a network layer, the payload is used to calculate a calculated checksum that is compared to the received checksum embedded in the header of the message. If the decryption key stream is out of synchronization with the encryption key stream, the calculated checksum will not equal the received checksum. The system can be reset to synchronize the two cipher streams. Accordingly, the exemplary embodiment allows the efficient use of resources by taking advantage of existing information contained in the data packets.

DETAILED DESCRIPTION OF THE PREFERRED EMBODIMENTS

As discussed above, conventional communication systems employ inefficient encryption schemes that waste bandwidth to provide a mechanism to detect a loss of synchronization between encryption and decryption stream ciphers. Cryptographic methods using stream ciphers require that the transmitter and receiver stay in synchronization. Conventional systems require additional information to be transmitted with the encrypted payload, allowing a receiver to detect a loss of synchronization based on the additional information. Unfortunately, the additional information requires additional valuable bandwidth. Further, conventional systems often require the use of complex message digest or checksum generators to provide the additional information which requires additional computational requirements by the system.

In the exemplary embodiment of the invention, the receiver can detect a loss of synchronization without additional information by analyzing information present in the message. The use of computational as well as bandwidth resources is therefore minimized.

Figure 1:
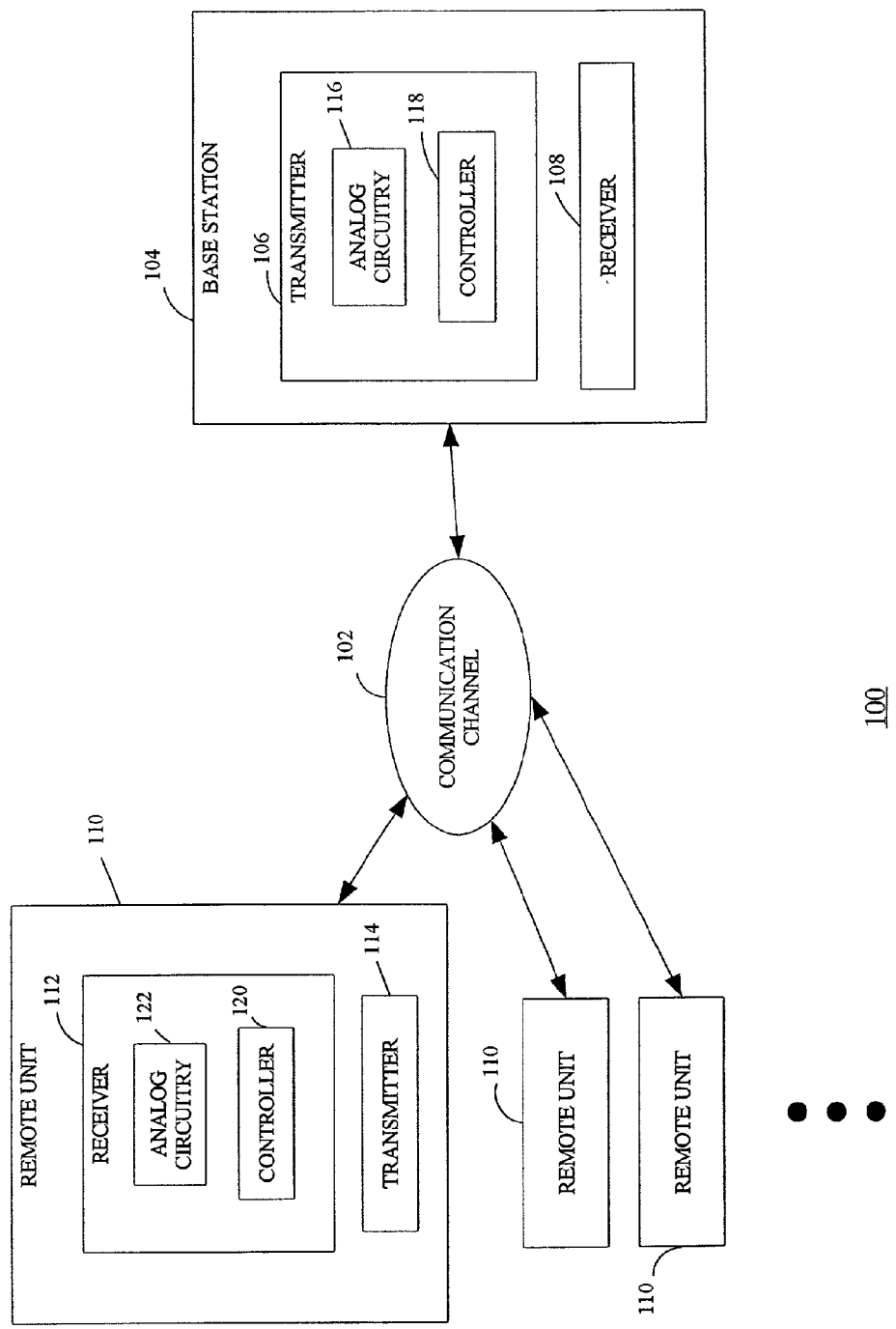
FIG. 1 is a block diagram of a communication system in accordance with an exemplary embodiment of the invention.

FIG. 1 is a block diagram of communication system 100 suitable for implementing the exemplary embodiment of the invention. The communication system 100 is a fixed wireless system providing communication services to subscriber premises through a communication channel 102. A base station 104 includes a transmitter 106 and a receiver 108 in addition to other circuitry, hardware and software (not shown) required to perform the functions described herein. A remote unit 110 located at the subscriber premises includes a receiver 112 for receiving signals transmitted from the transmitter 106 in the base station 104 and a transmitter 114 for transmitting signals to the receiver 108 at the base station 104. The communication system 100 may include several remote units 110 and may have any one of a variety of configurations. As discussed below in further detail, data to be received by the remote unit 110 is encrypted in the base station 104 and transmitted through a wireless communication channel 102. Although the communication system 100 is a fixed wireless system in the exemplary embodiment, those skilled in the art will recognize that the teachings herein can be applied to other types of communication systems and the present invention is not limited to wireless systems or wireless communication channels.

In addition to analog circuitry 116 such as antennas, amplifiers, mixers, control circuits and other components, the transmitter 106 within the base station 104 includes a controller 118, such as a processor, microprocessor or any other processor arrangement. Software code running on the controller 118 facilitates the overall functionality of the transmitter 106 in addition to the encryption and transmission functions described herein. As is known, circuitry within the transmitter 106 may be implemented as part of the receiver 108. The controller 118, for example, may facilitate the operation of the receiver 108 in the base station 104. In the exemplary embodiment, data is transmitted from the base station 104 to the remote units 110 on the forward communication channel and from the remote units 110 to the base station 104 on the reverse communication channel. Based on the discussion in regard to the transmission of data from the base station 104 to the remote unit 110, those skilled in the art will readily apply the teachings herein to the communication link from the remote unit 110 to the base station 104. Accordingly, in the interest of brevity, the discussion below is limited to the forward communication link from the base station 104 to the remote unit 110.

The receiver 112 in the remote unit 110 includes a controller 120 in addition to analog circuitry 122 such as antennas, amplifiers, mixers, control circuits and other components. The controller 120 may be a processor, microprocessor or any other processor arrangement or combination suitable for running software code that facilitates the overall functionality of the remote unit 110 in addition to the decryption and receiver functions described herein. The controller 120, for example, may facilitate the operation of the transmitter 114 in addition to other tasks in the remote unit 110.

Figure 2:
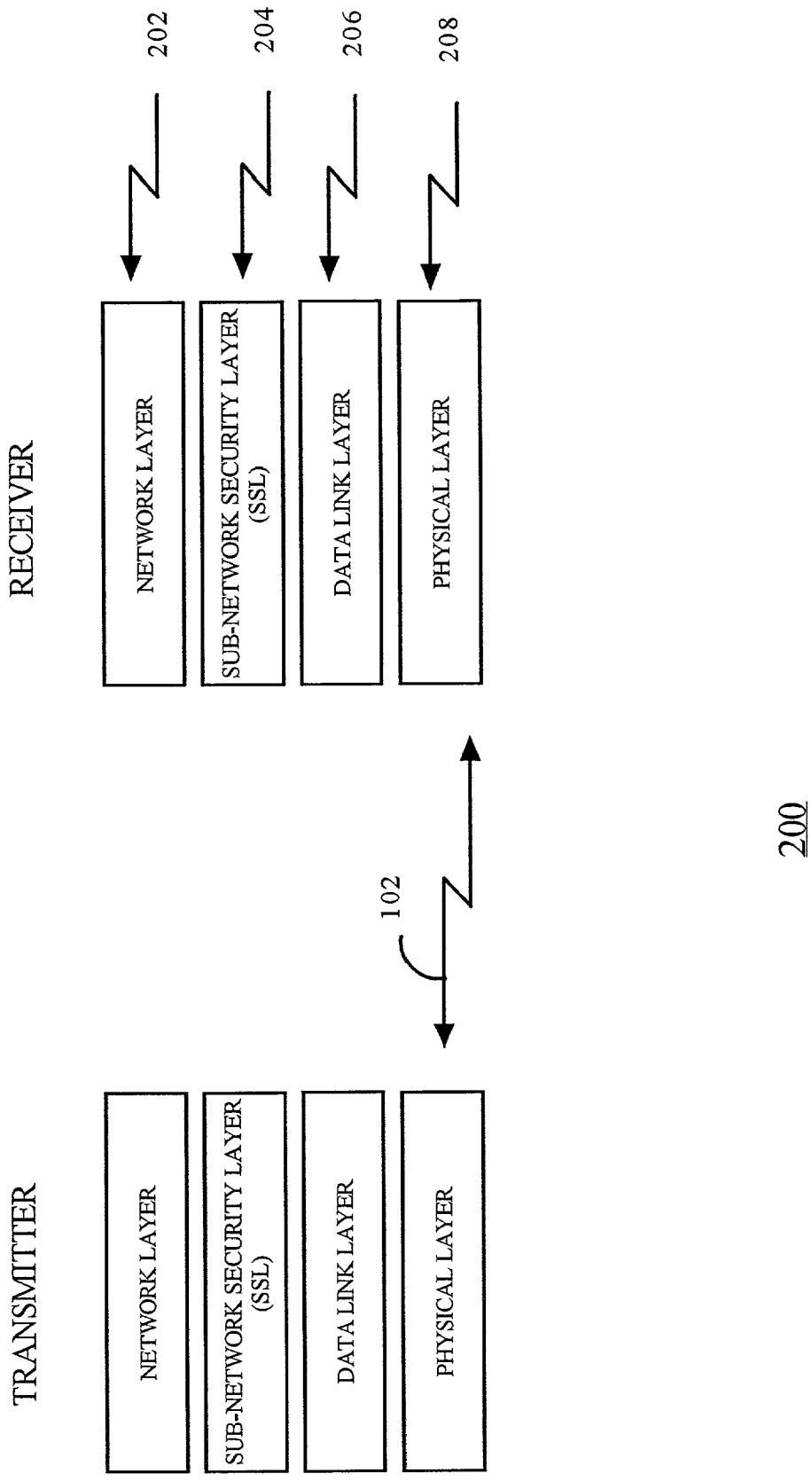
FIG. 2 is a block diagram of a protocol stack in accordance with the exemplary embodiment of the invention.

FIG. 2 is a block diagram illustrating a communication protocol stack 200 in accordance with the exemplary embodiment of the invention. As is known, communication systems typically employ a network architecture that includes a set of several levels or layers that operate together. Control is passed from each layer to the next starting at the highest level and proceeding through the hierarchy to the lowest or bottom layer. Those skilled in the art will readily recognize the various alternate network layer schemes that can be used in accordance with the invention and the various terminology that can used to refer to the various layers (202-208) in a communication protocol stack 200. For example, the set of layers and interfaces between layers is often referred to as a network architecture or protocol hierarchy which can contain any number of layers and organizations depending on the particular communication system 100.

In the exemplary embodiment, the communication protocol stack 200 includes at least a network layer 202, a sub-network security layer (SSL) 204, a data link layer 206, and physical layer 208. The communication protocol stack 200, however, may include any number of layers (202-208) or sub-layers depending on the particular communication system 100. Layers which are higher on the hierarchy of the protocols are referred to as upper layers while layers relatively lower than other layers are referred to as lower layers or sub-layers. Therefore, the network layer 202 is an upper layer while the SSL 204 is a lower layer as compared to the network layer 202 and any other layer above the network layer 202. The network layer 202 provides internetworking for a communication session. The SSL layer 204 facilitates the security of the communications. The data link layer 206 provides the transmission of a data packet from the transmitter to the receiver while the physical layer 208 provides the transmission of the bits over the communication channel 102. An example of a network layer 202 includes a TCP/IP layer where the upper application layers include HTTP, SMTP and others protocols.

Figure 3:
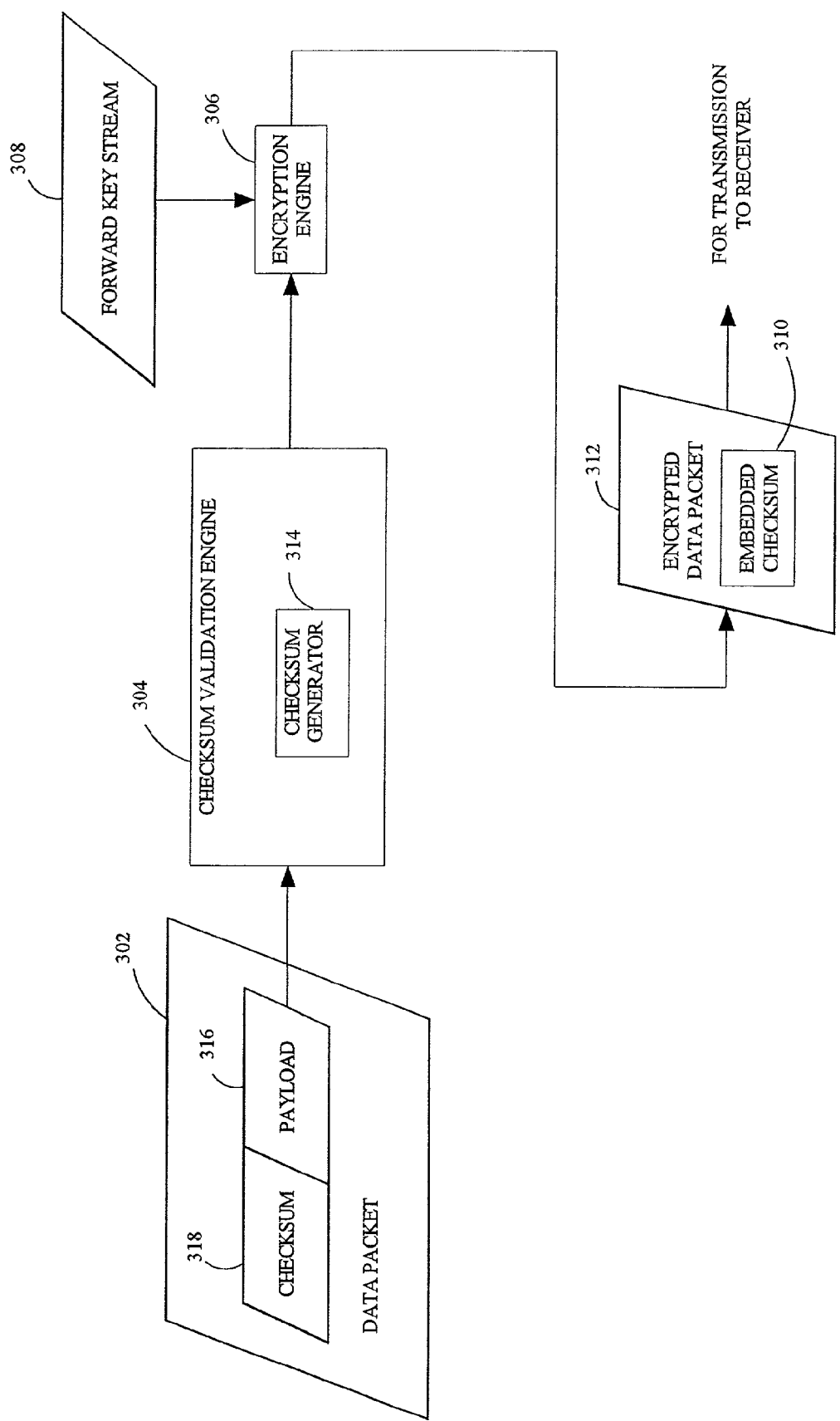
FIG. 3 is a block diagram of a transmitter in accordance with the exemplary embodiment of the invention.

FIG. 3 is a pictorial representation of a data flow of the loss of cryptographic synchronization detection process performed in the transmitter 106. In the exemplary embodiment, a similar procedure is performed at the remote unit 110 for a data packet 302 that is transmitted from the remote unit 110 to the base station 104. As discussed above, the loss of synchronization detection techniques can be applied to a variety of communication and data systems. Although in the exemplary embodiment the encryption and detection functions are performed using software code running on the controller 120, the various functional blocks described below may be implemented either solely in or in any combination of hardware, software, or firmware.

As described below in further detail, a data packet 302 to be transmitted from the transmitter 106 to the receiver 112 is received from an upper network layer by a checksum validation engine 304 and forwarded to an encryption engine 306 if the checksum is accurate. The encryption engine 306 encrypts the data packet 302 using a forward key stream 308 to produce an encrypted data packet 312.

The data packet 302 to be transmitted from the base station 104 to the remote unit 110 may include a variety of information or control messages and is received at the encryption engine 306 as a packet data unit having at least a payload 316 and network layer checksum 318 included in a header (not shown) in the exemplary embodiment. The data packet 302, however, may be received in a variety of formats. For example, the raw data may be a continuous stream, may be arranged into other types of packets or may include some level of error correction. The header includes at least the network layer checksum 318 derived using the network protocol as implemented at the network layer 202. The network layer checksum 318, however, may be included within the data packet 302 in other ways. The network layer checksum 318, for example, may be included within a region or set of bits dedicated to the checksum, such as a suffix or dedicated bin of bits within the data packet 302.

The information contained within the payload 316 of the message appears generally as data to some layers (204, 206, 208) of the communication protocol stack 200. The payload 316, however, may include other information such as addressing information in addition to user data as interpreted by a network layer 202. Accordingly, the term payload 316 is not intended to be limited to represent only user data. Those skilled in the art will recognize that information at one layer may appear as payload and may have additional meaning when interpreted at another layer. This concept can be analogized to the delivery of mail. A letter may be written and placed in an envelope addressed to an individual. The envelope is placed in a mail box with other envelopes. When the envelope is transported to a post office with other envelopes by the carrier, all the envelopes (and the addressing information on the envelopes) appear as a "payload" to the carrier. The addressing information, however, on each envelope is interpreted at the post office in order to direct each envelope to the appropriate recipient.

In the exemplary embodiment, the network layer checksum 318 is received from the network layer 202 and is based on information contained in the header. The network layer checksum 318 may be based on a portion of the payload 316 or the entire payload 316. Further, the network layer checksum 318 may be based on information with a header, information with a suffix, on user data or any combination of the three.

A checksum generator 314 within the checksum validation engine 304 calculates a checksum for the payload 312. The checksum validation engine 304 compares the result to the network layer checksum 318 included within the data packet 302 to verify the accuracy of the network layer checksum 318. The checksum validation engine 304 performs the validation procedure in accordance with the network layer protocol at the network layer 202 and may be implemented as software on the controller 118.

If the checksum validation engine 304 determines that the network layer checksum 318 is not correct, the data packet 302 is dropped and is not further processed. Otherwise, the encryption engine 306 encrypts the data packet 302 using the forward cipher key stream 308. Those skilled in the art will recognize that validation of the network layer checksum 318 can be performed where the accuracy of the network layer checksum 318 is trusted. The forward key stream 308 is an arrangement of bits formed in accordance with known techniques and is also referred to in the art as a key stream, cipher stream, cryptographic cipher stream and by other terms readily recognized by those skilled in the art. Since the forward key stream 308 is used for encryption in the transmitter 106, it is also referred to as an encryption key stream (308). The forward key stream 308 used at the receiver for decryption is referred to as the decryption key stream (308). The decryption key stream and encryption key stream are identical in the exemplary embodiment.

In the exemplary embodiment, the encryption engine 306 uses RC4 key stream encryption techniques to apply a forward key stream 308 to incoming data packet 302 to produce the encrypted data packet 312 that includes an embedded checksum 310. The encryption engine 306, however, may use any other suitable stream cipher encryption techniques. Examples of other cipher stream techniques include exclusive-or or modular addition with the output of a linear feedback shift register and block ciphers used in an output feedback mode or counter mode. The encrypted data packets 312 are transmitted by the transmitter 106 through the communication channels 102 using the appropriate circuitry within the transmitter to 106 in accordance with known techniques.

Therefore, after the checksum validation engine 304 verifies the accuracy of a network layer checksum 318 of a data packet at a network layer (upper layer) 202, the encryption engine 306, at the Security Subnetwork Layer (SSL) 204, applies a forward key stream 308 to the data packet 302 to form an encrypted data packet 312 that includes the embedded checksum 310. The encrypted data packet 312 is forwarded to a lower data link layer where the encrypted data packet 312 is transmitted through a wireless communication channel 102 that ensures a reliable, sequential delivery of the encrypted data packet 312.

Figure 4:
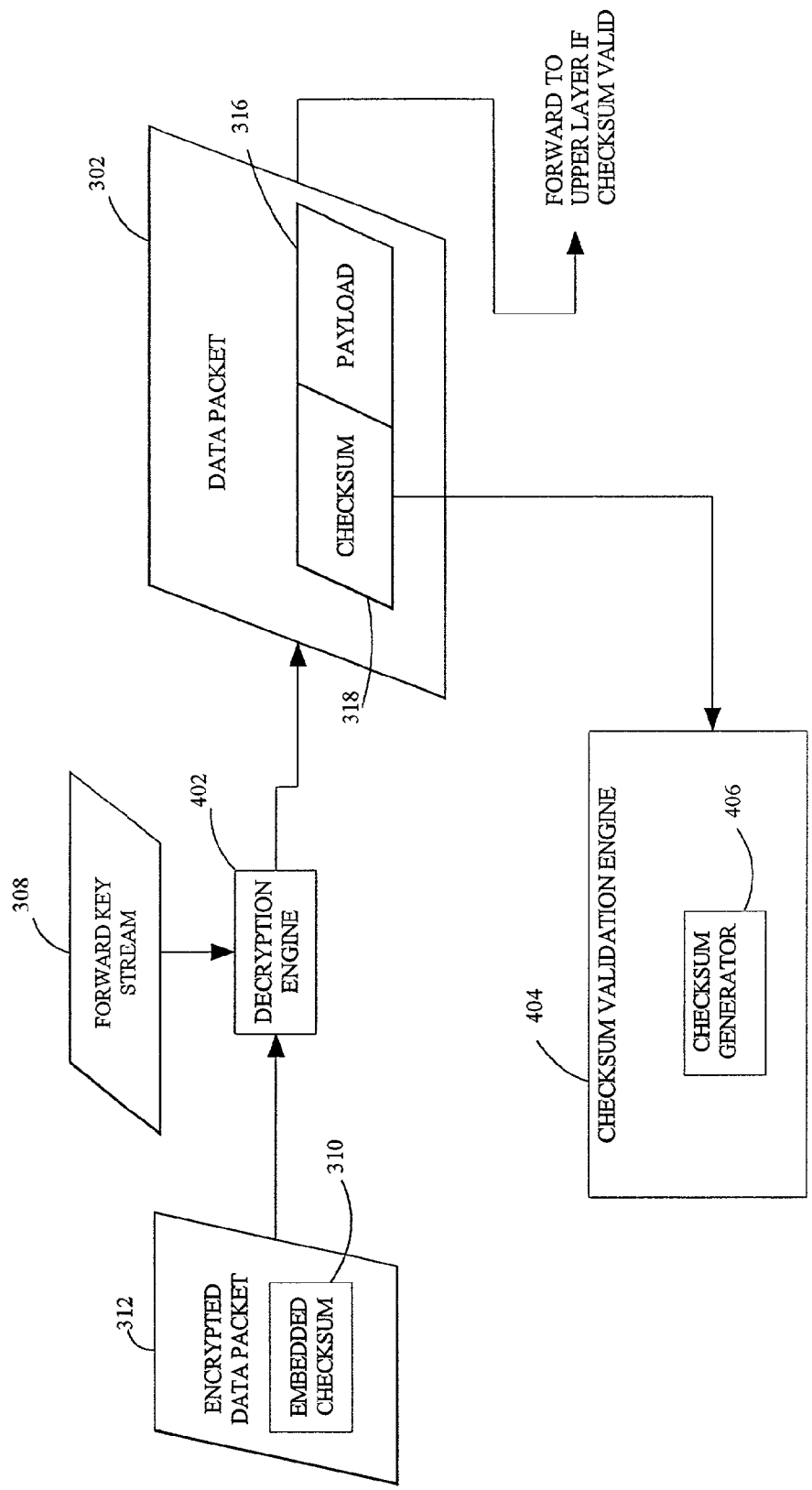
FIG. 4 is a block diagram of a receiver in accordance with the exemplary embodiment of the invention.

FIG. 4 is pictorial representation of a data flow of the loss of synchronization detection and decryption processes performed in the receiver 112. As discussed above, the decryption and loss of synchronization techniques can be applied to a variety of communication and data systems. Although in the exemplary embodiment the receiving, security, and loss of synchronization detection functions are performed using software code running on the controller 120 within the receiver 112, the various functional blocks described below may be implemented either solely in or in any combination of hardware, software, or firmware.

The encrypted data packet 312 is received through the communication channel 102 using the appropriate circuitry 120, 122 in the receiver 112 and in accordance with known techniques. The data link layer passes the data packet to the SSL 204 where the incoming encrypted data packet 312 that includes the embedded checksum 310 is decrypted in a decryption engine 402 by applying the forward cipher key (decryption key stream) 308 to the encrypted data packet 312 in accordance with known techniques. The resulting data packet 302 includes the checksum 318 and the payload 316.

After the data packet is parsed using known techniques, a checksum validation engine 404 determines if the embedded network layer checksum 110 matches a calculated checksum for the received data packet 302. A checksum generator 406 calculates the calculated checksum on the data packet 302. The checksum validation process is performed at the network layer 202 of the protocol stack 200 in accordance with the network layer protocol. Since the wireless communication channel 102 provides reliable sequential delivery, a mismatch indicates that a loss of synchronization between the cipher streams at the transmitter 106 and receiver 112 has occurred. In other words, if the calculated checksum does not equal the embedded checksum 310, a loss of synchronization is detected. In the exemplary embodiment, the data packet 302 is dropped if there is mismatch and a resynchronization procedure is initiated. Otherwise, the data packet 302 is forwarded for further processing at the network layer 202.

Figure 5:
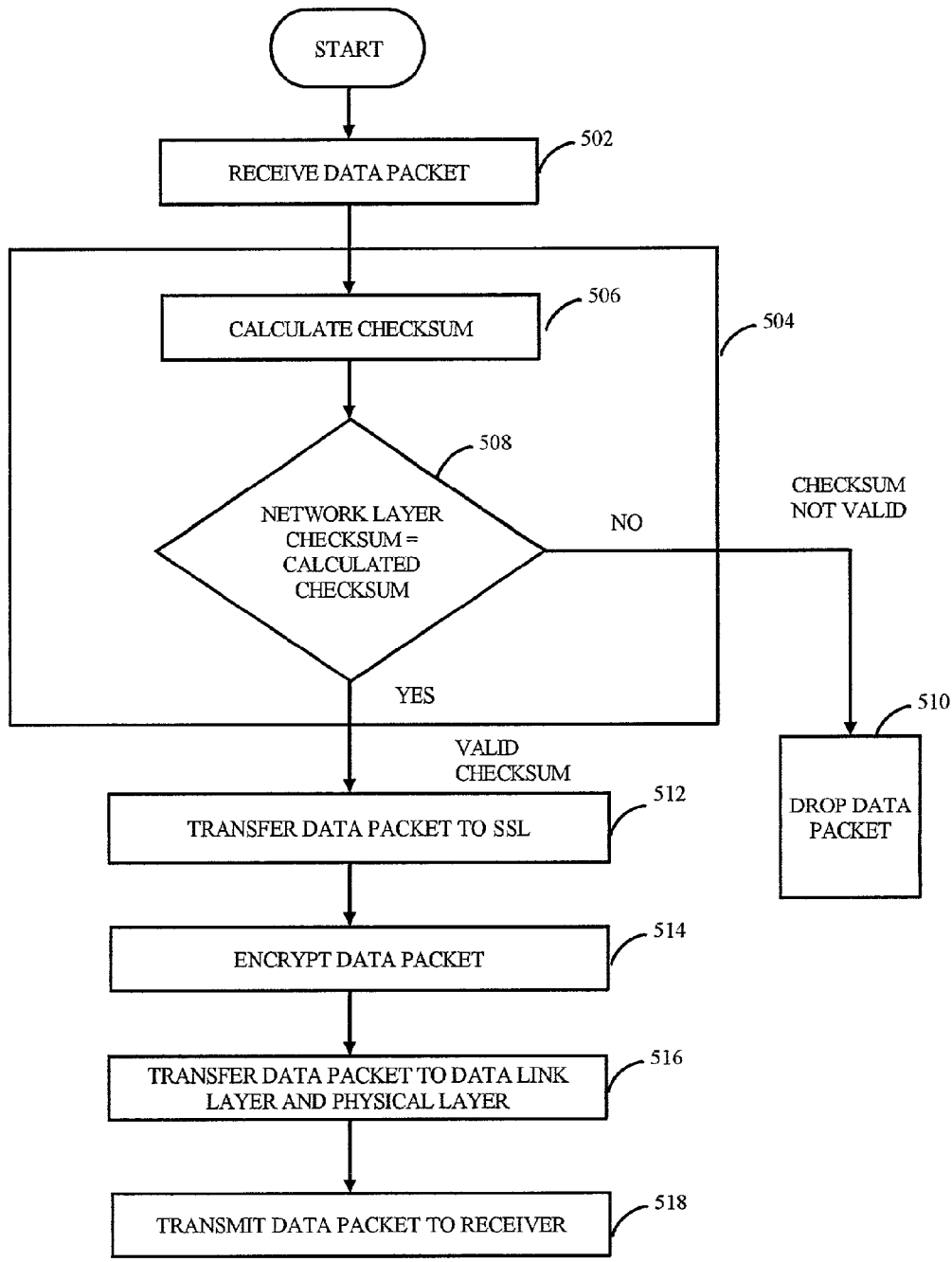
FIG. 5 is a flow chart of a method of transmitting a signal in accordance with the exemplary embodiment of the invention.

FIG. 5 is a flowchart of the method for detecting a loss of synchronization performed in the transmitter 106. In the exemplary embodiment of the invention, the encryption and detection functions performed at the sending end of the communication system 100 are implemented using software code running on a processor within the transmitter 106. Other techniques, however, may be used to perform the methods described in FIG. 5 and the systems of FIGS. 3 and 4. The functions, for example, may be implemented using hardware, software, firmware or other combinations of similar techniques.

At step 502, the data packet 302 to be transmitted to the receiver is received at the network layer 202. As explained above, the data packet 302 may be formatted in a variety of ways and includes at least a network layer checksum 318 and a payload 316.

At step 504, the checksum validation engine 304 validates the accuracy of the network layer checksum 318 in accordance with known techniques at the network layer 202. The checksum generator 314 calculates a calculated checksum for the data packet which is compared to the network layer checksum 318 included in the data packet 302.

In the exemplary embodiment, step 504 includes steps 506-508. A calculated checksum is generated for the data packet 302 by the checksum generator 314 in accordance with the network protocol at step 506.

The calculated checksum is compared to the embedded checksum at step 508. If the calculated checksum is equal to the embedded checksum 318, the procedure continues at step 512. Otherwise, the data packet 302 is dropped at step 510. Therefore, if the embedded checksum is valid, the procedure continues at step 512; and if the embedded checksum 310 is not valid, the data packet 302 is dropped at step 510.

At step 512, the data packet 302 is transferred to the SSL 204 of the protocol stack 200. As explained above, the communication protocol stack 200 may include several layers or levels (202-208).

At step 514, the encryption engine 306 encrypts the data packet to form an encrypted data packet 312 that includes an embedded network layer checksum (embedded checksum) 310. A forward cipher key is used to encrypt the data packet 302. As explained above, cipher stream techniques may be used to encrypt the data packet 302.

At step 516, the encrypted data packet 312 is transferred to the data link layer 206 and to the physical layer 208 and transmitted to the receiver through the wireless communication channel 102. The wireless communication channel 102 provides reliable, sequential delivery of the data packet 302.

At step 518, the encrypted data packet 312 is transmitted through the communication system 100 to the remote unit. The encrypted data packet 312 is modulated, amplified and transmitted through the communication channel 102 in accordance with known techniques.

Figure 6:
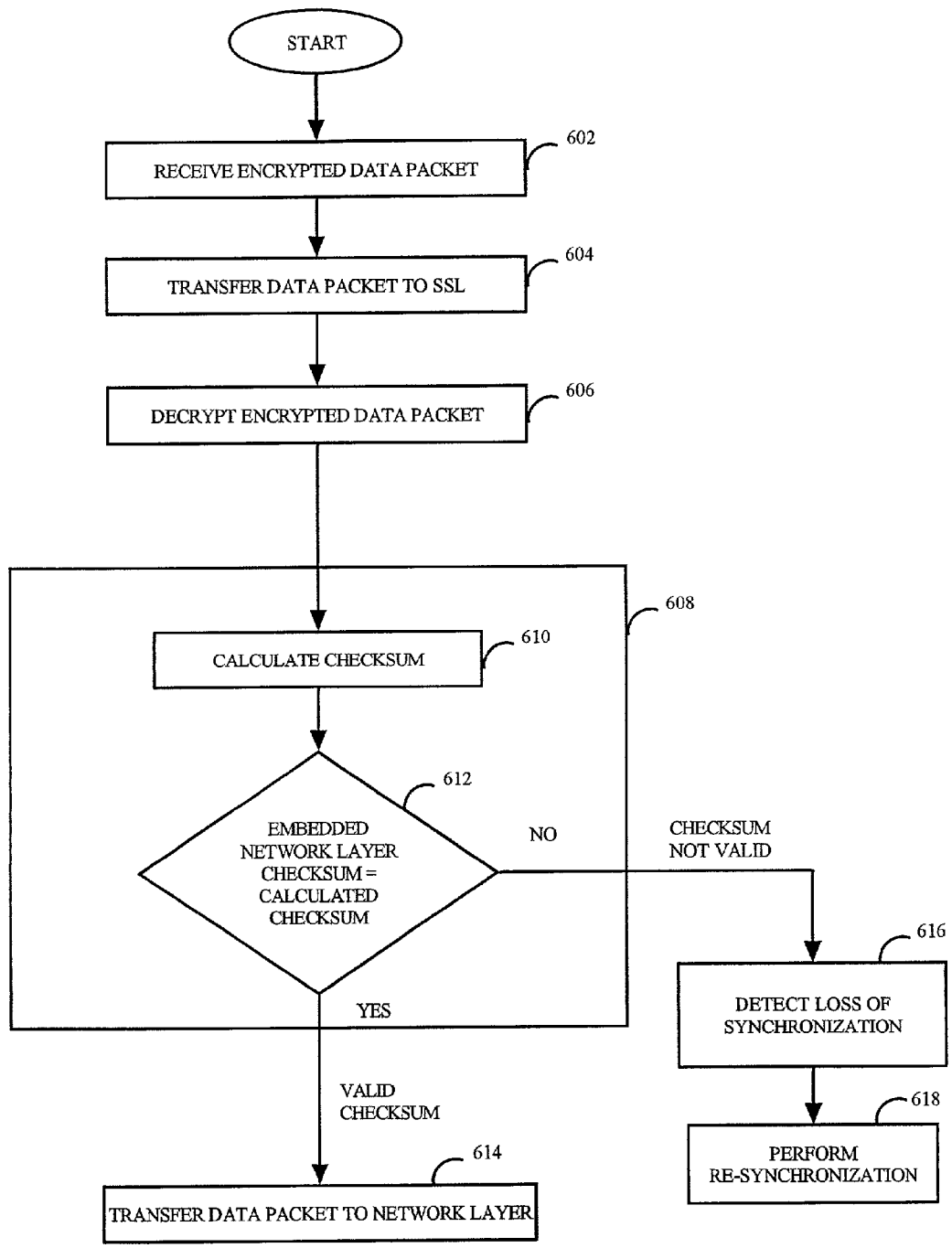
FIG. 6 is a flow chart of a method of receiving a signal in accordance with the exemplary embodiment of the invention.

FIG. 6 is a flow chart of a method performed at the receiver 112 for detecting a loss of synchronization between the key streams at the transmitter 106 and receiver 112.

At step 602, an encrypted data packet 312 is received at the receiver 112. The encrypted data packet 312 is transmitted from the transmitter 106 in the base station 104 through the communication channel 102 and includes at least the payload 316 and the embedded checksum 310.

At step 604, the encrypted data packet 312 is transferred to the SSL 204. In the exemplary embodiment, the controller 120 processes the data packet 312 in accordance with the protocol stack 200 to apply the appropriate level of processing at each level and, therefore, transfers processing to the SSL 204 after processing at the data link layer 206 and physical layer 208.

At step 606, the encrypted data packet 312 is decrypted using the forward cipher key 308.

At step 608, the embedded checksum is validated. In the exemplary embodiment, the checksum validation engine 404 validates the network layer checksum 318 by performing steps 610 and 612.

At step 610, a calculated checksum is generated by the checksum generator 406 based on the payload 316 of the data packet 302.

At step, 612, the checksum validation engine 404 determines if the network layer checksum 318 is equal to the calculated checksum. If the checksums are the same, the procedure continues at step 614 where the data packet 302 is transferred to the network layer for further processing. Otherwise, the procedure continues at step 616 where a loss of synchronization is detected.

After a loss of synchronization is detected at step 616, a resynchronization procedure is performed at step 618. Several re-synchronization techniques may be used where one suitable example includes resetting the crypto code stream.

The crypto system may be reset using any one of various techniques. One example includes directing the lower layer 206 to hang up from the crypto layer and informing the upper layer 202 that the communication link has been compromised. Those skilled in the art will recognize the variations and modifications to this example and form other techniques for resetting the system 100. For example, the single step of directing the lower layer 206 to end the call can be used. After step 618, the process returns to step 602 to receive another encrypted data packet 212.

Therefore, in the exemplary embodiment, the transmitter 106 transmits an encrypted data packet 312 through a wireless communication channel 102 that ensures a reliable and sequential delivery of data. The encrypted data packet 312 includes at least a payload and an embedded network layer checksum 310. The decryption engine 402 in the receiver 112 applies the forward key stream 308 to decrypt the encrypted data packet 302. At a network layer, the network layer checksum is evaluated to determine if it is valid by comparing a calculated checksum to the network layer checksum 318. If the network layer checksum 318 is valid, the process the data packet 302 is further processed at the network layer. Otherwise, a loss of synchronization is detected.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

We claim:

1. A receiver comprising:
   a controller adapted to receive a data packet within a code stream, and transmit the data packet to a sub-network security layer;
   a decryption engine adapted to decrypt the data packet, data packet containing a checksum and a payload, the checksum included in a header of the data packet and based upon the payload, the decrypting accomplished using a forward cipher key;
   a checksum generator configured to calculate a calculated checksum for the data packet; and
   a checksum validation engine configured to compare the calculated checksum with the checksum extracted from the decrypted data packet to determine the integrity of the data packet;
   wherein the controller resets the code stream upon a determination that the integrity of the data packet is compromised, and
   wherein the controller transmits the data packet to a network layer upon a determination that the integrity of the data packet is not compromised.

2. The receiver of claim 1, wherein the checksum validation engine is further configured to detect a loss of stream cipher synchronization if the calculated checksum does not match the checksum extracted from the decrypted data packet.

3. The receiver of claim 1, wherein the decryption engine is further configured to receive the encrypted data packet at a data link layer, the data link layer providing communications through a wireless communication channel to transfer the encrypted data packet to a sub-network security layer.

4. The receiver of claim 3, wherein the checksum validation engine is further configured to reset the data link layer if the calculated checksum does not equal the checksum extracted from the decrypted data packet.

5. The receiver of claim 1, wherein the checksum validation engine is further configured to re-synchronize a stream cipher with a transmitter of the encrypted data packet if the calculated checksum does not match the checksum extracted from the decrypted data packet.

6. A communication system comprising:
a controller at a receiver, the controller adapted to receive a code stream from a transmitter and transmit the code stream to a sub-network security layer, the code stream including an encrypted data packet containing a checksum and a payload, the checksum included in a header of the data packet and based upon the payload;
a decrypting engine at the sub-network security layer, the decrypting engine adapted to receive the encrypted data packet and to decrypt the encrypted data packet using a forward cipher key;
a checksum generator at the receiver, the checksum generator configured to calculate a calculated checksum for the decrypted data packet; and
a checksum validation engine at the receiver, the checksum validation engine configured to compare the calculated checksum with the checksum extracted from the decrypted data packet to determine the integrity of the data packet;
wherein the controller resets the code stream upon a determination that the integrity of the data packet is compromised, and
wherein the controller transmits the data packet to a network layer upon a determination that the integrity of the data packet is not compromised.

7. The system of claim 6, wherein the checksum validation engine is further configured to detect a loss of stream cipher synchronization if the calculated checksum does not match the checksum extracted from the decrypted data packet.

8. The system of claim 6, further comprising a transmitter encryption engine configured to encrypt the payload at a transmitter network layer to form the encrypted data packet.

9. The system of claim 6, wherein the transmitter transmits the encrypted data packet through a wireless channel at a data link layer.

10. The system of claim 9, wherein the decryption engine is further configured to receive the encrypted data packet at a data link layer, the data link layer providing communications through the wireless communication channel to transfer the encrypted data packet to a sub-network security layer.

11. The system of claim 10, wherein the checksum validation engine is further configured to reset the data link layer if the calculated checksum does not equal the checksum extracted from the decrypted data packet.

12. The system of claim 6, wherein the checksum validation engine is further configured to re-synchronize a stream cipher with a transmitter of the encrypted data packet if the calculated checksum does not match the checksum extracted from the decrypted data packet.

13. A computer program product stored on a non-transitory computer-readable medium for key stream out-of-synchronization detection, the computer program product comprising logic enabling a processor to:
decrypt a data packet containing a checksum and a payload, the data packet being part of a code stream received at a controller and transmitted to a sub-network security layer, the checksum included in a header of the data packet and based upon the payload, the decrypting accomplished using a forward cipher key;
extract the checksum from the decrypted data packet;
calculate a calculated checksum for the data packet, the calculated checksum generated by a checksum generator based on the payload of the data packet;
compare the checksum extracted from the decrypted data packet with the calculated checksum at a checksum validation engine;
detect a loss of stream cipher synchronization if the calculated checksum does not match the checksum extracted from the decrypted data packet,
reset the code stream upon a determination of the loss of stream cipher synchronization, and
transmit the data packet to a network layer upon a determination that the integrity of the data packet is not compromised.

14. The computer program product of claim 13, wherein the detecting a loss of stream cipher synchronization if the calculated checksum does not match the checksum extracted from the decrypted data packet is performed at a network layer of a protocol stack.

15. The computer program product of claim 13, further comprising comparing the calculated checksum and the checksum extracted from the decrypted data packet both for a network layer data payload.

16. The computer program product of claim 13, further comprising resetting the data link layer if the calculated checksum does not equal the checksum extracted from the decrypted data packet.

17. The computer program product of claim 14, further comprising re-synchronizing a stream cipher with a transmitter of the encrypted data packet if the calculated checksum does not match the checksum extracted from the decrypted data packet.

* * * * *